US012334012B2

(12) United States Patent
Choi

(10) Patent No.: US 12,334,012 B2
(45) Date of Patent: Jun. 17, 2025

(54) DISPLAY DEVICE WITH CONSISTENT LUMINANCE AT DIFFERENT REFRESH RATES

(71) Applicant: Google LLC, Mountain View, CA (US)

(72) Inventor: Sangmoo Choi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/282,400

(22) PCT Filed: Dec. 6, 2021

(86) PCT No.: PCT/US2021/062000
§ 371 (c)(1),
(2) Date: Sep. 15, 2023

(87) PCT Pub. No.: WO2023/075808
PCT Pub. Date: May 4, 2023

(65) Prior Publication Data

US 2024/0127751 A1 Apr. 18, 2024

Related U.S. Application Data

(60) Provisional application No. 63/273,427, filed on Oct. 29, 2021.

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS

| | | | | |
|---|---|---|---|---|
| 10,490,128 B1 * | 11/2019 | Qian | G09G 3/3266 |
| 11,011,113 B1 | 5/2021 | Lu et al. | |
| 2009/0027310 A1 * | 1/2009 | Kim | G09G 3/3233 345/76 |

(Continued)

FOREIGN PATENT DOCUMENTS

WO WO 2020211053 10/2020

OTHER PUBLICATIONS

[No author listed], "Different Display Configurations on the i.MX31 WinCE PDK," Freescale Semiconductor, Inc, Mar. 2010, 68 pages.

(Continued)

*Primary Examiner* — Antonio Xavier
(74) *Attorney, Agent, or Firm* — Fish & Richardson P.C.

(57) ABSTRACT

The subject matter described in this disclosure includes a pixel circuit with an LED and a driving transistor having a drain terminal that is connected to the LED to supply power to the LED. The pixel circuit also includes a second transistor that is connected between the LED and an initialization voltage line, the second transistor having a gate terminal connected to a scan line. The pixel circuit also includes a third transistor that is connected between the LED and the initialization voltage line in series with the second transistor, the third transistor having a gate terminal connected to a reset line. The pixel circuit is configured so that activating the scan line at a first frequency and activating the reset line at half the first frequency causes the LED to be initialized every other time the scan line is activated.

10 Claims, 7 Drawing Sheets

(52) U.S. Cl.
CPC ............... *G09G 2300/0861* (2013.01); *G09G 2310/08* (2013.01); *G09G 2320/0247* (2013.01); *G09G 2330/021* (2013.01); *G09G 2340/0435* (2013.01)

(58) Field of Classification Search
CPC ....... G09G 2310/08; G09G 2320/0247; G09G 2330/021; G09G 2340/0435; G09G 2310/066; G09G 2310/0251; G09G 2310/0262; G09G 2320/0233
See application file for complete search history.

(56) References Cited

U.S. PATENT DOCUMENTS

| | | | | |
|---|---|---|---|---|
| 2015/0062193 | A1* | 3/2015 | Kanda | G09G 3/3291 345/77 |
| 2020/0312234 | A1 | 10/2020 | Lin et al. | |
| 2021/0125543 | A1 | 4/2021 | Kim et al. | |
| 2021/0193046 | A1 | 6/2021 | Wang et al. | |
| 2021/0287605 | A1 | 9/2021 | Wang et al. | |
| 2022/0044635 | A1* | 2/2022 | Roh | G09G 3/3258 |
| 2022/0367597 | A1* | 11/2022 | Nishiyama | G09G 3/3233 |
| 2023/0028312 | A1* | 1/2023 | Wang | G09G 3/3258 |

OTHER PUBLICATIONS

International Search Report and Written Opinion in International Appln. No. PCT/US2021/062000, mailed on Jul. 7, 2022, 15 pages.

International Preliminary Report on Patentability in International Appln. No. PCT/US2021/062,000, mailed on May 10, 2024, 13 pages.

* cited by examiner

DISPLAY DEVICE WITH CONSISTENT LUMINANCE AT DIFFERENT REFRESH RATES

CROSS-REFERENCE TO RELATED APPLICATIONS

This application is a US $371 National Stage Application from PCT/US2021/062000, filed Dec. 6, 2021, which claims the benefit of priority to U.S. Provisional Application Ser. No. 63/273,427, filed Oct. 29, 2021.

TECHNICAL FIELD

This document generally relates to a display device with consistent luminance at different refresh rates.

BACKGROUND

Electronic devices can include display panels on which visual images are shown. An electronic device can change a refresh rate at which new image data is provided to a display panel. A high refresh rate can provide a smoother presentation of content to a user, at expense of additional power consumption with respect to a lower refresh rate.

SUMMARY

This document describes techniques, methods, systems, and other mechanisms for providing a display device with consistent luminance at different refresh rates. Particular implementations can, in certain instances, realize one or more of the following advantages. The technology described in this disclosure enables a display to present content at a high refresh rate with lower power consumption than traditional technologies. The technology described in this disclosure enables a display to use a single luminance profile for multiple refresh rates (e.g., three or more refresh rates).

As additional description to the embodiments described below, the present disclosure describes the following embodiments.

Embodiment 1 is a pixel circuit, including: an LED with an anode terminal and a cathode terminal; a driving transistor including a drain terminal, the drain terminal of the driving transistor being connected to the anode terminal of the LED to supply power to the LED; a second transistor that is connected between an initialization voltage line that specifies an initialization voltage and the anode terminal of the LED, the second transistor having a gate terminal that is connected to a scan line; and a third transistor that is connected between the initialization voltage line and the anode terminal of the LED in series with the second transistor, the third transistor having a gate terminal that is connected to a reset line, wherein the pixel circuit is configured so that activating the scan line at a first frequency and activating the reset line at a second frequency that is half the first frequency causes the pixel circuit to initialize the LED based on the initialization voltage every other time the scan line is activated.

Embodiment 2 is the pixel circuit of embodiment 1, comprising a fourth transistor connected between the initialization voltage line and a gate terminal of the driving transistor, the fourth transistor having a gate terminal that is connected to a second scan line that is different from the scan line.

Embodiment 3 is the pixel circuit of any one of embodiments 1-2, wherein the pixel circuit is configured so that: activating the scan line at the first frequency includes periodically turning the second transistor on at the first frequency; activating the reset line at the second frequency includes periodically turning the third transistor on at the second frequency; and the pixel circuit initializes the LED responsive to the pixel circuit turning the second transistor on and the third transistor on simultaneously.

Embodiment 4 is the pixel circuit of embodiment 3, wherein the pixel circuit is configured so that: activating the scan line at the first frequency includes periodically turning on the second transistor for a first period of time; activating the reset line at the second frequency includes periodically turning on the third transistor for a second period of time; the first period of time overlaps with the second period of time; and the second period of time is greater than the first period of time.

Embodiment 5 is the pixel circuit of any one of embodiments 1-4, wherein the pixel circuit is configured so that, at a first display device refresh frequency that has a first frame time, the pixel circuit alternates between a first frame type and a second frame type, the first frame type includes the scan line being activated concurrently with the reset line being activated, causing both the LED and the gate terminal of the driving transistor to be initialized based on the initialization voltage, and the second frame type includes the scan line being activated concurrently with the reset line being not activated, causing the LED to be left without being initialized and the gate terminal of the driving transistor to be initialized based on the initialization voltage.

Embodiment 6 is the pixel circuit of embodiment 5, wherein during the second frame type a voltage across the LED drops to a threshold voltage of the LED based on power to the LED being interrupted.

Embodiment 7 is the pixel circuit of any one of embodiments 5-6, wherein the pixel circuit is configured so that, at a second display device refresh frequency that is half the first display device refresh frequency, the pixel circuit repeatedly presents a third frame type that includes a first frame portion and a second frame portion, the first frame portion includes the scan line being activated concurrently with the reset line being activated, causing both the LED to be initialized based on the initialization voltage and the gate terminal of the driving transistor to be initialized based on the initialization voltage; and the second frame portion includes the scan line being not activated concurrently with power to the LED being interrupted, causing the LED to turn off without being initialized and the gate terminal of the driving transistor being left without being initialized.

Embodiment 8 is the pixel circuit of embodiment 7, wherein: the first frame portion represents a first half of the third frame type; and the second frame portion represents a second half of the third frame type.

Embodiment 9 is the pixel circuit of any one of embodiments 7-8, wherein the second frame portion, during which the scan line is not activated concurrently with power to the LED being interrupted, causes a voltage across the LED to drop to a threshold voltage of the LED and the gate terminal of the driving transistor to maintain a previously-programmed voltage value.

Embodiment 10 is the pixel circuit of any one of embodiments 7-9, wherein: the first display device refresh frequency corresponds to 120 Hz; and the second display device refresh frequency corresponds to 60 Hz.

Embodiment 11 is a method of driving a display device at multiple different refresh rates, comprising: operating the display device at a first refresh rate in which new image data is programmed to the display device at a first refresh frequency, including by alternating between a first frame type and a second frame type, the first frame type including full pixel refresh, performed by initializing an LED of a pixel of the display device based on an initialization voltage and initializing a gate of a driving transistor of the pixel based on the initialization voltage, the driving transistor connected to the LED to provide power to the LED, and the second frame type including a full pixel refresh with skipped LED discharge, performed by leaving the LED without being initialized and initializing the gate of the driving transistor based on the initialization voltage; operating the display device at a second refresh rate in which new image data is programmed to the display device at a second refresh frequency that is half the first refresh frequency, including by repeatedly presenting a third frame type that includes: the full pixel refresh, performed by initializing the LED based on the initialization voltage and initializing the gate of the driving transistor based on the initialization voltage, and an emission refresh, performed by interrupting power to the LED while leaving the LED without being initialized.

Embodiment 12 is the method of embodiment 11, wherein: the pixel includes a second transistor that is connected between an initialization voltage line that specifies the initialization voltage and an anode terminal of the LED, the second transistor having a gate terminal that is connected to a scan line; the pixel includes a third transistor that is connected between the initialization voltage line and the anode terminal of the LED in series with the second transistor, the third transistor having a gate terminal that is connected to a reset line; and alternating the display device between the first frame type and the second frame type includes activating the scan line at the first refresh frequency and activating the reset line at a frequency that is half the first refresh frequency.

Embodiment 13 is the method of any one of embodiments 11-12, wherein: performing the full pixel refresh includes interrupting power to the LED and programming the gate of the driving transistor with image data, in addition to initializing the LED and initializing the gate of the driving transistor.

Embodiment 14 is the method of embodiment 13, wherein: performing the emission refresh includes leaving the gate of the driving transistor without being initialized and not programming image data to the gate of the driving transistor, in addition to interrupting power to the LED while leaving the LED without being initialized.

Embodiment 15 is the method of embodiment 14, wherein presenting the third frame type includes performing the full pixel refresh before the emission refresh.

Embodiment 16 is the method of any one of embodiments 14-15, wherein: performing the full pixel refresh with skipped LED discharge includes interrupting power to the LED, in addition to leaving the LED without being initialized and initializing the gate of the driving transistor based on the initialization voltage.

Embodiment 17 is the method of any one of embodiments 11-16, comprising: operating the display device at a third refresh rate in which new image data is programmed to the display device at a third refresh frequency that is half the second refresh frequency, including by repeatedly presenting a third frame type that includes: the full pixel refresh, performed by initializing the LED based on the initialization voltage and initializing the gate of the driving transistor based on the initialization voltage, the emission refresh, performed by interrupting power to the LED while leaving the LED without being initialized, and a self-refresh, performed by interrupting power to the LED while leaving the gate of the driving transistor without being initialized.

Embodiment 18 is the method of embodiment 17, wherein performing the self-refresh includes leaving the LED without being initialized.

Embodiment 19 is the method of any one of embodiments 17-18, wherein: the first refresh frequency corresponds to 120 Hz; the second refresh frequency corresponds to 60 Hz; and the third refresh frequency corresponds to 30 Hz.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes a display device with consistent luminance at different refresh rates.

Figure 1:
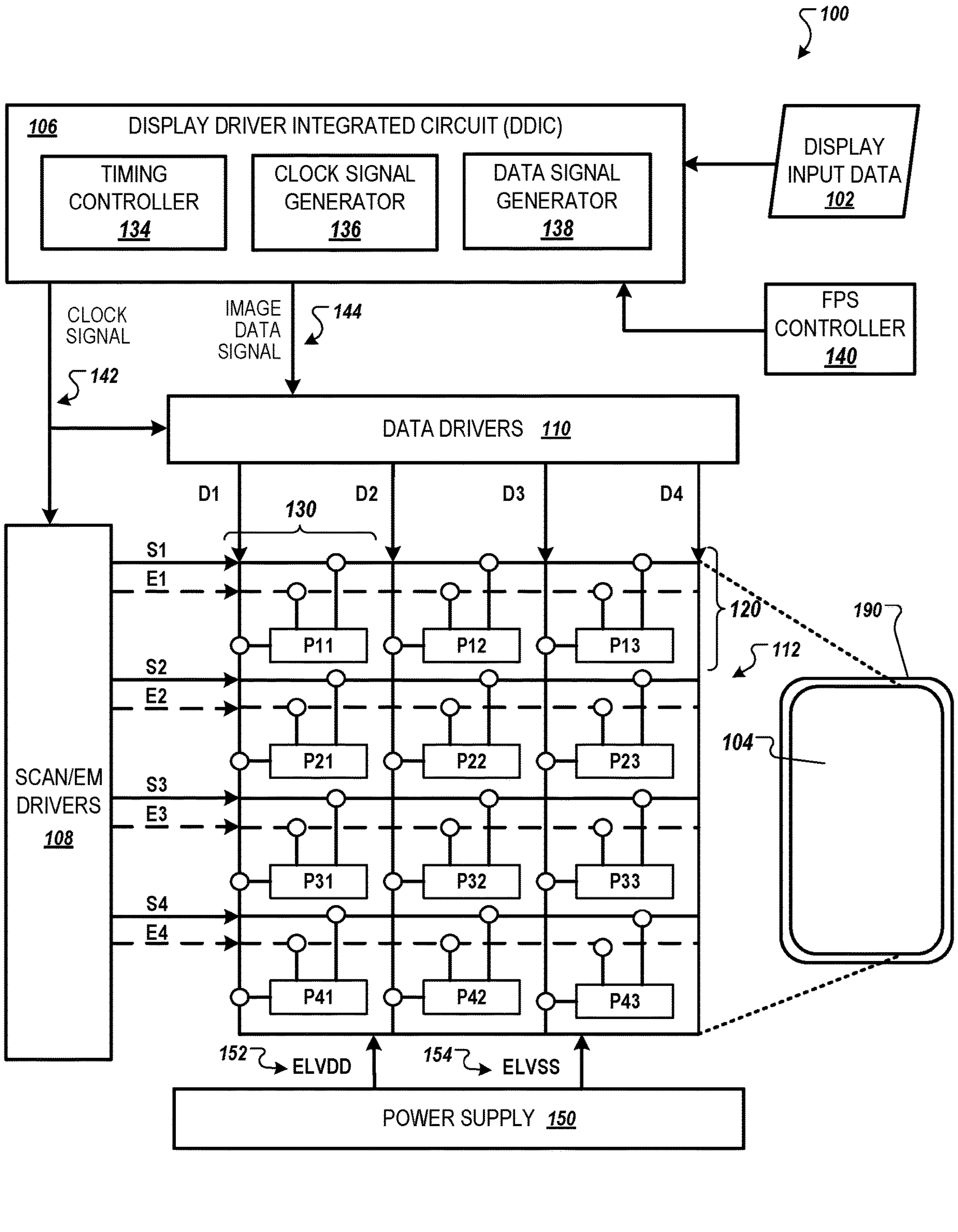
FIG. 1 shows a diagram of an example display system of an electronic device.

FIG. 1 is a diagram of an example display system 100 of computing device 190. The display system 100 is an OLED display system that includes an array 112 of light emitting pixels. Each light emitting pixel includes an OLED. The OLED display is driven by drivers, including SCAN/EM drivers 108 and data drivers 110. The SCAN/EM drivers 108 can be integrated, i.e., stacked, row line drivers. In general, the SCAN/EM drivers 108 select a row of pixels in the display, and the data drivers 110 provide data signals (e.g. voltage data (VDATA)) to the pixels in the selected row, to light the OLEDs in the selected row according to image data specified by the voltage data. Signal lines such as scan lines, EM lines, and data lines may be used in controlling the pixels to display images on the display. Although FIG. 1 illustrates the display system 100 having the SCAN/EM drivers 108 on a single side of the display, the SCAN/EM drivers 108 can be placed on both left and right sides of the display to improve driving performance (e.g., speed).

The pixel array 112 includes a plurality of light emitting pixels, for example, the pixels P11 through P43. A pixel is a small element of a display that can change color based on the image data supplied to the pixel. Each pixel includes an OLED and circuitry to address and drive the OLED (e.g., the components shown in FIGS. 2A and 7A). Each pixel within the pixel array 112 can be addressed separately to produce various intensities of color. Each pixel maintains a mostly steady luminance throughout a frame time, displaying light corresponding to the supplied image data. A frame time, or frame period, is an amount of time between a start of a frame and a start of a next frame. The frame time can be the inverse of a frame rate of a display system. For example, a frame rate of 60 frames per second (fps) corresponds to a frame time of one-sixtieth of a second, or 0.0167 seconds.

The pixel array 112 extends in a plane and includes rows and columns. Each row extends horizontally across the pixel array 112. For example, the first row 120 of the pixel array 112 includes pixels P11, P12, and P13. Each column extends vertically down the pixel array 112. For example, the first column 130 of the pixel array 112 includes pixels P11, P21, P31, and P41. Only a few pixels are shown in FIG. 1 for simplicity. In practice, there may be thousands or millions of pixels in the pixel array 112. Increasing the numbers of pixels in a display that remains the same size results in a higher image resolution.

The display system 100 includes a display driver integration circuit (DDIC) 106 that receives display input data 102. The DDIC 106 can be, for example, a semiconductor integrated circuit or a state machine. The DDIC 106 generates signals with suitable voltage, current, timing, and demultiplexing to cause the display 104 to show images according to display input data 102. In some examples, the DDIC can be a microcontroller and may incorporate RAM, Flash memory, EEPROM, ROM, etc.

The DDIC 106 includes a timing controller 134, a clock signal generator 136, and a data signal generator 138. The DDIC 106 generates a clock signal 142. The clock signal 142 can be, for example, a signal that controls a display frame start time and a display frame stop time of each frame presented by the display panel 104, where a frame represents a single image in a sequence of images that are presented by the display panel 104. In examples in which each frame presented by the display panel includes multiple emission cycles, the clock signal 142 or another signal not illustrated in FIG. 1 can control a display emission start time and a display emission stop time of each emission cycle of the display panel 104.

The display system 100 includes SCAN/EM drivers 108 and data drivers 104. In some examples, the SCAN/EM drivers 108, the data drivers 110, or both, can be integrated with the DDIC 106. The SCAN/EM drivers supply SCAN and EM signals to rows of the pixel array 112. For example, the SCAN/EM drivers 108 supply scan signals via scan lines S1 to S4, and EM signals via EM lines E1 to E4, to the rows of pixels.

The data drivers 110 supply signals to columns of the pixel array 112. For example, based on the image data signal 144 from the DDIC 106, the data drivers 110 supply data to the columns of pixels via data lines D1 to D4, with data being provided to a single row at a time based on which row is currently selected by the scan/EM signals. For example, the data drivers 110 specify a data voltage for each pixel in a currently-selected row according to the image data signal 144. The data drivers 110 apply the selected data voltage as the data signal to the data lines D1-D4.

The clock signal 142 can be used to drive the SCAN/EM drivers 108 and the data drivers 110. Thus, the DD IC 106 controls the timing of the scan signals, EM signals, and data signals.

The display system 100 includes a power supply 150. The power supply 150 provides a first supply voltage ELVDD and a second supply voltage ELVSS. In some examples, the power supply 150 can be integrated with the DDIC 106.

Each pixel in the pixel array 112 is addressable by a horizontal scan line and EM line, and a vertical data line. For example, the pixel P11 is addressable by the scan line S1, the EM line E1, and the data line D1. In another example, the pixel P32 is addressable by the scan line S3, the EM line E3, and the data line D2.

The SCAN/EM drivers 108 and the data drivers 110 provide signals to the pixels enabling the pixels to reproduce the image on the display. The SCAN/EM drivers 108 and the data drivers 110 provide the signals to the pixels via the scan lines, the emission lines, and the data lines. To provide the signals to the pixels, the SCAN/EM drivers 108 select a scan line and control the emission operation of the pixels. The data drivers 110 provide data signals to the pixels addressable by the selected scan line to light the selected OLEDs at intensities specified by the image data.

The scan lines are addressed sequentially for each frame. A scan direction determines an order in which the scan lines are addressed. In the display system 100, the scan direction is from top to bottom of the pixel array 112. For example, the scan line S1 is addressed first, followed by the scan line S2, then S3, etc.

While FIG. 1 illustrates that each row is addressed by a single scan line and a single emission line, each row may be addressed by multiple scan lines (e.g., nSCAN and pSCAN) as described throughout this disclosure and shown in other figures.

Although FIG. 1 illustrates example components of an OLED display, the described techniques may be applied to other flat panel display technologies that include an array of pixels. For example, the technology may be applied to light emitting diode (LED), liquid crystal displays (LCD), and plasma display panels (PDP).

Figure 2A:
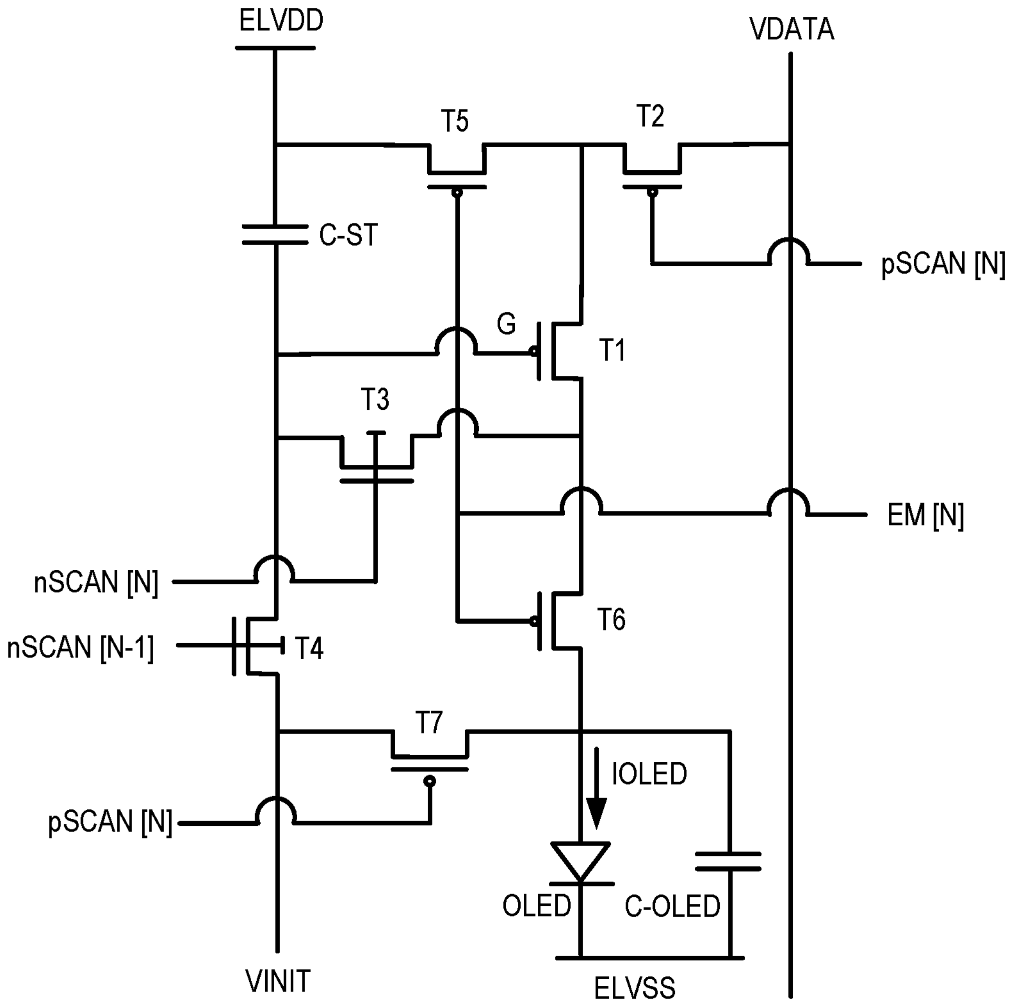
FIGS. 2A-B show a diagram of a pixel circuit of a display device and a corresponding timing diagram.

FIG. 2A shows a diagram of a pixel circuit of a display device, which pixel circuit includes an LED and corresponding drive circuitry for the pixel circuit. For example, FIG. 2A may illustrate a more detailed view of a single pixel from the array of pixels shown in FIG. 1. While this disclosure often refers to the components shown in FIG. 2A as a "pixel circuit", this disclosure may also refer to such components as "pixel." Further, the pixel shown in FIG. 2A can represent a sub-pixel.

The pixel circuit may be an active matrix OLED (AMOLED) pixel circuit. The pixel circuit receives an emission signal EM, nSCAN signals, a pSCAN signal, and a data voltage VDATA signal. The pixel circuit 200 receives a first supply voltage ELVDD, a second supply voltage ELVSS, and an initial reference voltage VINIT.

The pixel circuit includes an organic light-emitting diode (OLED). The OLED includes a layer of an organic compound that emits light in response to an electric current, IOLED. The organic layer is positioned between two electrodes: an anode and a cathode. The OLED is driven by a driving transistor T1, which receives the supply voltage ELVDD and acts as a current source that drives the OLED to emit light.

The pixel also includes a storage capacitor C-ST and transistors T2 through T7. The operation of the pixel is defined by states of the control signals nSCAN, pSCAN, EM, and VDATA. The OLED current, IOLED, is set by a voltage present at a gate terminal of the driving transistor T1, which is known as the "G" node. For example, the driving transistor T1 has a threshold voltage VTH between the gate terminal of the driving transistor T1 and a source terminal of the driving transistor T1, and any voltage between the gate terminal and the source terminal that is above the threshold voltage VTH causes the driving transistor T1 to create a conducting path from the source terminal to the drain terminal.

Figure 2B:
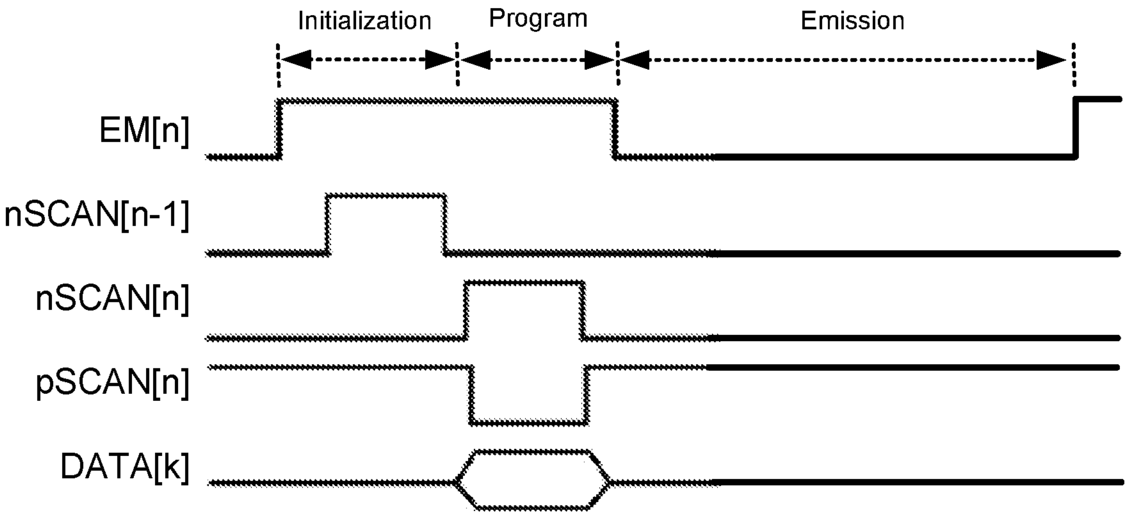

FIG. 2B shows a timing diagram of the control signals for the pixel. These control signals transition during operation between an initialization stage, a programming stage, and an emission stage.

During the initialization stage, the EM signal transitions to an off state (e.g., by changing from a low state to a high state). This transition turns off transistors T5 and T6, which interrupts current being provided from ELVDD to the OLED, and which therefore stops light emission by the OLED. The nSCAN (N−1) signal also turns on, which turns on transistor T4 and initializes the G node to the initialization voltage VIN IT.

During the programming stage, the nSCAN signals turn on (e.g., by going high) and the pSCAN signal turns on (e.g., by going low), which turns on transistors T2, T3, and T7. This causes the voltage value at the voltage data VDATA line to pass through transistors T2, T1 and T3 to the G node, setting the G node to a value based on the VDATA line (e.g., the voltage at VDATA minus an effect of transistor threshold voltage across T1).

During the emission stage, the EM signal turns on (e.g., by going low), which turns on transistors T5 and T6. Current flows from ELVDD through transistors T5, T1, and T6 to an anode of the OLED, with a current level being determined by the voltage at the G node. Thus, after the pixel has transitioned to the emission stage of the frame, a level of the current IOLED that flows through the OLED is based on the voltage set at the G node of the driving transistor (e.g., with the G node voltage level having been programmed by the voltage data VDATA line). An intensity or brightness of light emitted by the OLED directly correlates to an amount of electrical current IOLED applied, with higher current corresponding to a greater intensity of light than a lower current. The storage capacitor C-ST maintains the voltage at the G node, so that the OLED continues to emit light at roughly the same level for a duration of the emission stage.

Figure 3A:
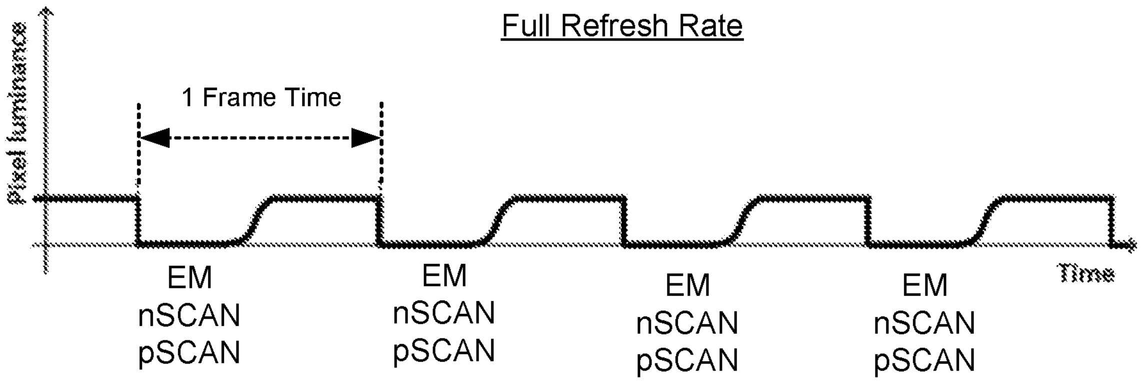
FIGS. 3A-C show luminance profiles for different types of refresh profiles.
Figure 3B:
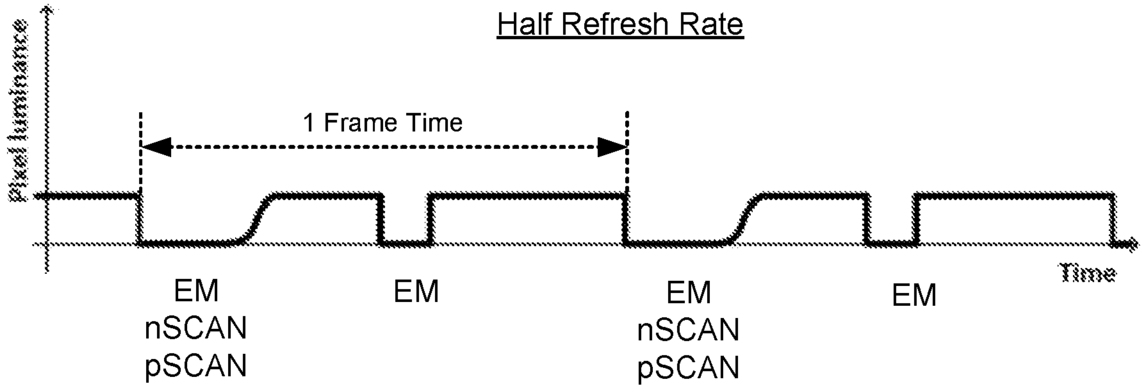
Figure 3C:
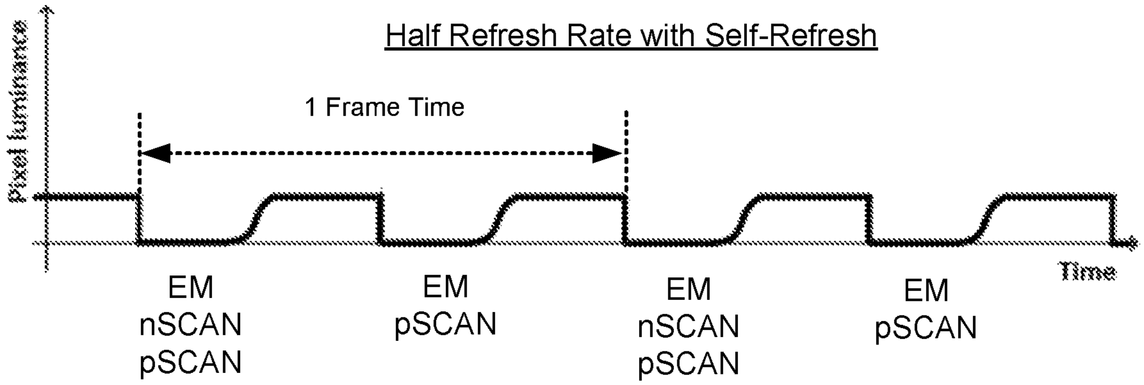

FIGS. 3A-C show luminance profiles for different types of refresh rates. Each luminance profile is illustrated with a graph, in which the y-axis shows pixel luminance (e.g., pixel brightness) and the x-axis represents passage of time. In this example, all the luminance profiles represent light emission by the same pixel over the same period of time, programmed with a consistent/repeating VDATA intensity value. A main/only difference is that the refresh rate/profile differs (e.g., the figures show different sequences in which the pixel is refreshed over a same period of time).

The FIG. 3A luminance profile illustrates a pixel at a "full" refresh rate, in which the pixel is fully refreshed every frame. In this illustration, the pixel is fully refreshed four times, before four respective emission periods in which the LED of the pixel emits light. Between each emission period, pixel intensity drops due to the pixel going through the initialization and programming stages (discussed in additional detail with respect to FIG. 2B).

FIG. 3A shows the luminance profile for the pixel shown in FIG. 2A when that pixel receives the nSCAN, pSCAN, and EM control signals according to the timing diagram shown in FIG. 2B.

The transition of the pixel at the beginning of each emission period from "off" (no luminance) to "on" (high luminance) is illustrated in FIG. 3A as curved, to indicate that the intensity of the pixel increases at a relatively slow rate after having been programmed with new data. A reason for this slow transition from off to on is because the nSCAN and pCAN signals were previously turned on, which initialized the G node and the OLED anode to the initialization voltage VINT. The initialization voltage VINT is a low value, in some cases a negative voltage. As such, should the G node be programmed with a high voltage to produce a correspondingly high pixel intensity, it takes a relatively slow rate for the OLED to increase from the low "initialization" voltage to the higher "programmed" voltage.

The FIG. 3B luminance profile illustrates the FIG. 2A pixel operating at a "half" refresh rate. The EM control signal continues to pulse at the same rate as with respect to FIG. 3A, but the nSCAN and pSCAN signals pulse at half the rate. This results in a refresh profile that repeatedly alternates between (1) pulsing the EM, nSCAN, and pSCAN control signals and (2) pulsing just the EM control signal. In such an emission scheme, the pixel (and by extension the entire array of pixels) is programmed with a new frame of image data half as often due to the nSCAN and pSCAN signals pulsing half as often. This results in FIG. 3B representing a frame time that is twice as long as the frame time shown with respect to FIG. 3A.

As noted above, even though the frame time in FIG. 3B is twice as long as the frame time in FIG. 3A, the refresh profile still turns the EM control signal off at the same rate as with FIG. 3A. As such, the emission rate remains the same between FIGS. 3A and 3B. A reason that the emission rate of the display device is configured to remains the same when the refresh rate is cut in half is because, if pixel luminance remained "high" until the end of the frame, there would be a notable difference in user-perceived intensity between the FIG. 3A refresh profile and the FIG. 3B refresh profile. In such an implementation, should a display switch from full refresh rate to half refresh rate (e.g., to save energy because a static picture is being displayed instead of a video), a user may notice the display become brighter because the pixels began emitting at full intensity for a greater proportion of a period of time. This emission at full intensity may also result in the display consuming more power at the half refresh rate, which at least partially negates a reason to switch from the full refresh rate to the half refresh rate in the first place.

Note that the transition of the EM control signal from off to on at the beginning of the second emission period in the FIG. 3B luminance profile is illustrated as being an abrupt transition to full intensity. Turning off the EM control signal turns off transistors T5 and T6, which interrupts current being provided to the OLED from ELVDD to the OLED. This stops light emission by the OLED and causes the voltage across the OLED and C-OLED to drop to the threshold voltage across the OLED. The voltage at the G node is maintained by the capacitor C-ST during this interruption in OLED emission. As such, once the EM control signal turns on T5 and T6, the driving transistor T1 is programmed to drive current at the same current as before emission was turned off. The voltage across the OLED and C-OLED has dropped to the transition voltage, but this drop is not as significant as the drop to the initialization voltage VINT that occurs during the initialization stage. As such, a pixel only discharged to the threshold voltage (and not fully initialized to the lower initialization voltage) is able to rise to the previous emission level more quickly than a fully initialized OLED. This quick rise is illustrated in FIG. 3B by the abrupt transition from "off" to "on" in the middle of the frame in FIG. 3B.

The FIG. 3C luminance profile illustrates the pixel at a half refresh rate that alternates between a full refresh and a self-refresh. A self-refresh is performed by pulsing only the pSCAN control signal and not the nSCAN signals while pixel emission has been turned off. Pulsing the pSCAN signal turns on transistor T7 and initializes the voltage across the OLED to the initialization voltage VINT, just as with a full initialization. The voltage at the G node, however, is not discharged to the initialization voltage VINT (as with a full refresh), because the nSCAN control signals are not pulsed. See in FIG. 2A how turning on transistors T3 and T4 with the nSCAN signals would initialize the G node to the initialization voltage VINT, and how pulsing the pSCAN by itself without pulsing the nSCAN signals is able to initialize the OLED without initializing the G node.

As a result of the OLED being initialized, but the G node being left uninitialized, once the pixel transitions to the emission stage, the driving transistor T1 attempts to supply current at the previously-programmed rate to drive the OLED at the previous intensity. Since the OLED has been initialized to the low initialization voltage VINT value, an intensity of the OLED will rise relatively slowly to the previous intensity due to the presence of the OLED parasitic capacitance C-OLED. This results in a same "off-to-on" transition as with a full refresh. Accordingly, the FIG. 3C refresh profile, which alternates between a full refresh (e.g., effectuated by turning EM off and turning the nSCAN and pSCAN control signals on) and a self-refresh (e.g., effectuated by turning EM off and turning only the pSCAN control signal on) has the same luminance profile as the FIG. 3A refresh profile, which operates at twice the refresh rate but without any self-refreshes.

Figure 4A:
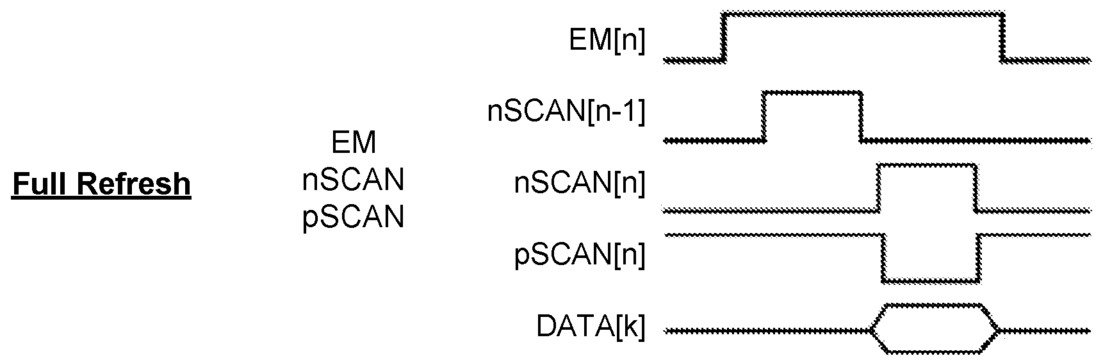
FIGS. 4A-C show timing diagrams for different ways to refresh a pixel.
Figure 4B:
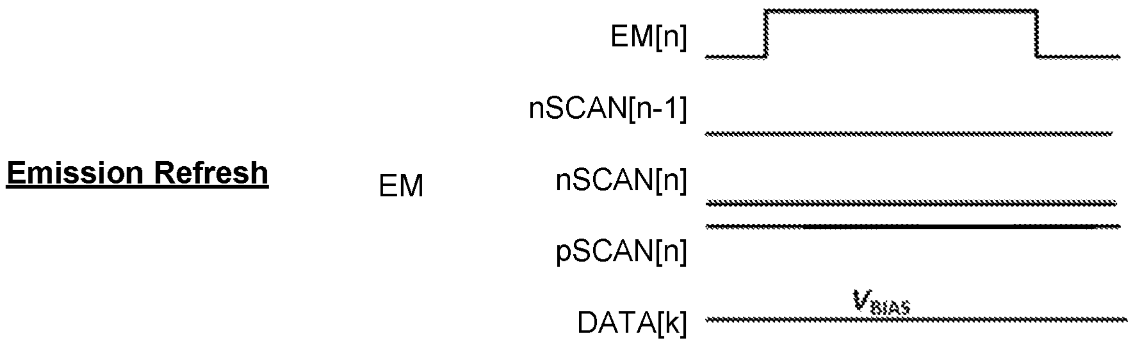
Figure 4C:
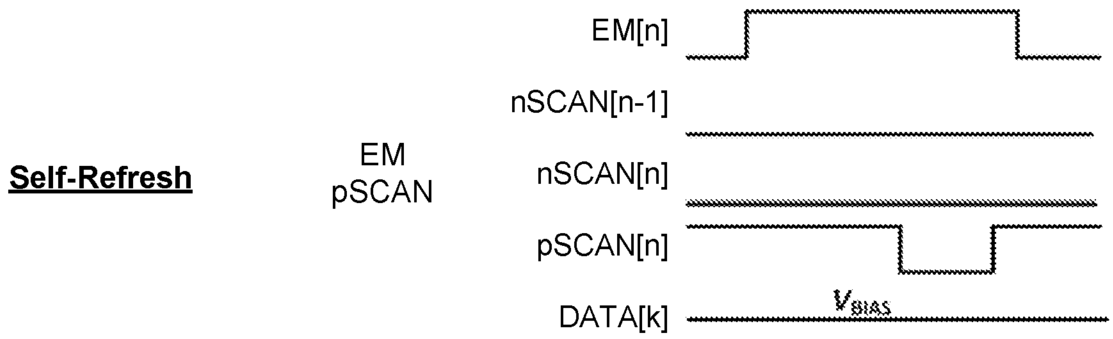

FIGS. 4A-C show timing diagrams for the three different types of pixel refreshes described with respect to FIGS. 3A-C: a full refresh, an emission refresh, and a self-refresh. Each figure illustrates a name of the type of refresh (shown at a left of each respective figure), a listing of the signals that are cycled to effectuate the refresh (shown at a middle of each respective figure), and a timing diagram that shows the progression of signals that are cycled to effectuate the refresh (shown at a right of each respective figure).

FIG. 4A shows a timing diagram for a full refresh, in which (1) the EM signal is turned off to stop LED emission, (2) the nSCAN[N−1] line is cycled to initialize the G node, (3) the nSCAN[N] and pSCAN[n] lines are cycled to program the G node of the pixel based on the voltage provided by the VDATA line, and (4) the pSCAN line is cycled to initialize the OLED. This is the same as the timing diagram shown in FIG. 2B, and is illustrative of the operations that occur with each full pixel refresh (illustrated in FIGS. 3A-C with every refresh cycle that is accompanied by the labels EM/nSCAN/pSCAN).

FIG. 4B shows a timing diagram for an emission refresh, in which the EM signal is turned off to stop LED emission, but the nSCAN and pSCAN signals are not turned on. This operation turns transistors T5 and T6 off to stop the flow of current to the OLED. As discussed above, this causes the voltage across the OLED and C-OLED to drop to the threshold voltage across the OLED. Since this voltage drop is not as substantial as a drop to the initialization voltage VINT and the G node is maintained at its existing voltage, the OLED intensity climbs to its previous intensity level relatively quickly after the EM signal is turned back on to resume LED emission (at least with respect to the increase in intensity level that occurs after the OLED is initialized). An emission refresh is illustrated in FIG. 3B by the refresh in the middle of each frame.

FIG. 4C shows a timing diagram for a self-refresh, in which the EM signal is turned off to stop LED emission, and only the pSCAN signal is cycled. This operation turns transistor T7 on, which initializes the OLED to the initialization voltage VINT without doing the same to the G node. As a result, once the emission signal EM is turned back on, the G node of the driving transistor T1 remains programmed to drive the OLED at the previous intensity. Since the OLED is fully discharged, the OLED transitions from "off" to "on" at a relatively slow rate. Self-refreshes are illustrated in FIG. 3C by the refresh in the middle of each frame.

Figure 5A:
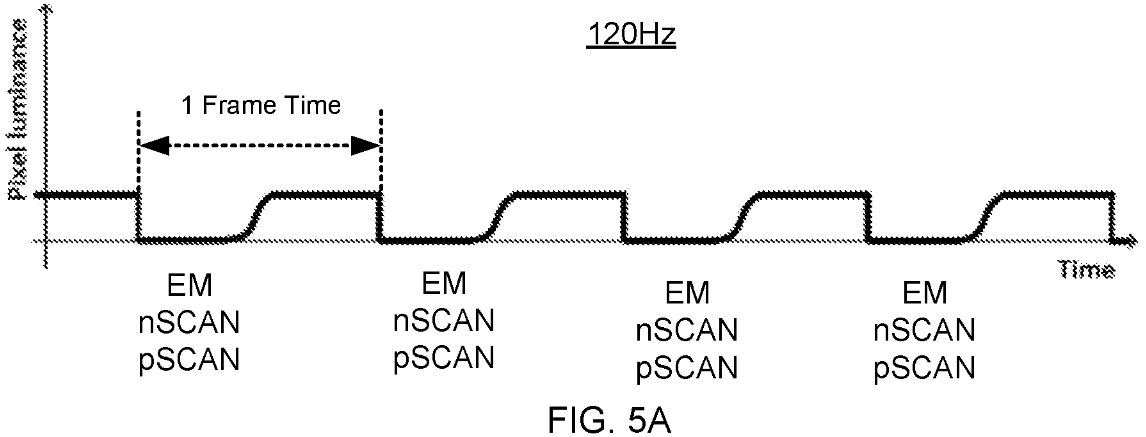
FIGS. 5A-C show inconsistent luminance profiles for three different refresh rates.
Figure 5B:
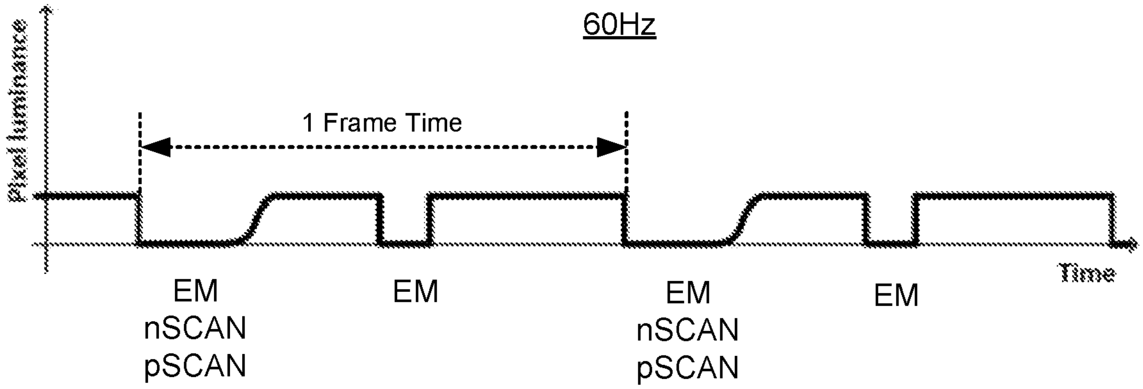
Figure 5C:
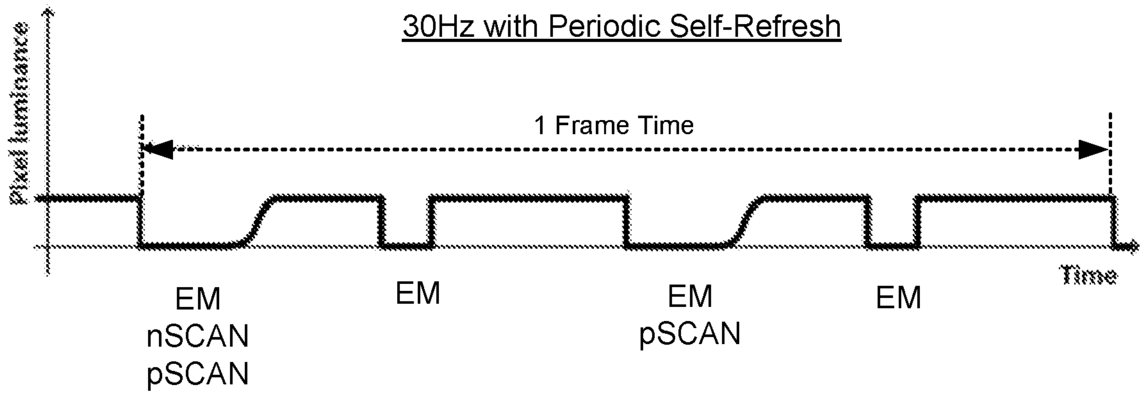

FIGS. 5A-C show inconsistent luminance profiles for three different refresh rates: 120 Hz (FIG. 5A), 60 Hz (FIG. 5B), and 30 Hz with a self-refresh (FIG. 5C). As such, for every full refresh performed by the 30 Hz refresh profile of FIG. 3C (indicated by the labels EM, nSCAN, and pSCAN), the 60 Hz refresh profile (FIG. 5B) performs two full refreshes and the 120 Hz refresh profile (FIG. 5A) performs four full refreshes. In other words, FIG. 5B illustrates a frame time half as long as that shown in FIG. 5C, and FIG. 5A illustrates a frame time a quarter as long as that shown in FIG. 5C.

In order to limit the number of different luminance profiles, and therefore limit the number of optical tunings (e.g., gamma correction and calibration tables), the display device is configured so that the FIG. 3C luminance profile employs a self-refresh during the third refresh cycle in each frame (illustrated in FIG. 5C by the EM/pSCAN labels near the middle of the frame). This self-refresh initializes the OLED to the initialization voltage VINT which, as described previously, causes the OLED to transition more slowly from "off" to "on" than if only the EM signal were turned off (as with the second and fourth refresh cycles of the FIG. 5C luminance profile).

FIGS. 5B-C show luminance profiles that are the same despite having different refresh rates, with each profile including refresh cycles that alternate between a gradual off-to-on transition and a rapid off-to-on transition. In contrast, the 120 Hz luminance profile illustrated in FIG. 5A includes a gradual off-to-on transition in every refresh cycle. The 120 Hz luminance profile does not alternate between different types of off-to-on transitions, and indeed does not have any rapid off-to-on transitions. As a result, an electronic device that operates a display panel by employing the three-refresh rate emission scheme shown by FIGS. 5A-C may flicker during a transition from 120 Hz to 60 Hz due to a step increase in overall display panel intensity. Similarly, a transition from 60 Hz to 120 Hz may flicker due to a step decrease in overall display panel intensity.

Figure 6A:
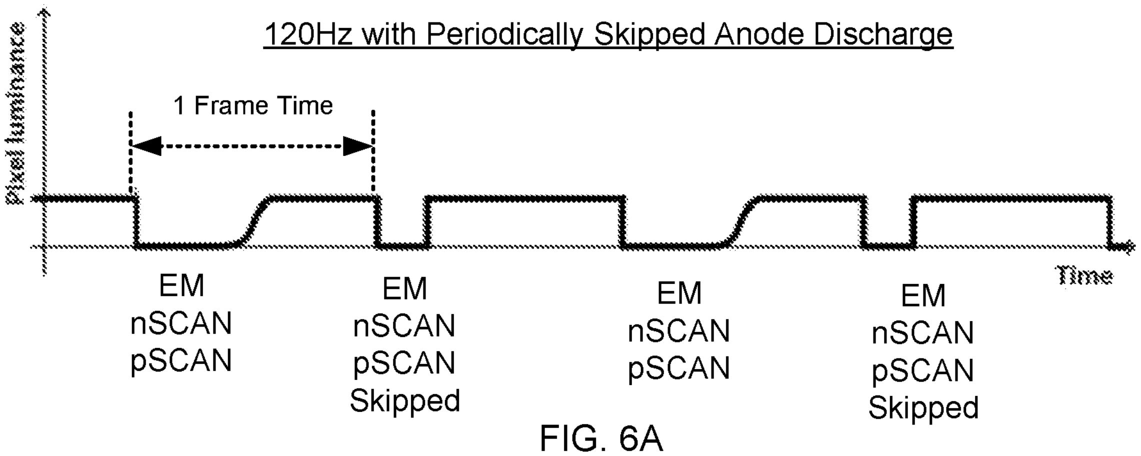
FIGS. 6A-C show consistent luminance profiles for three different refresh rates.
Figure 6B:
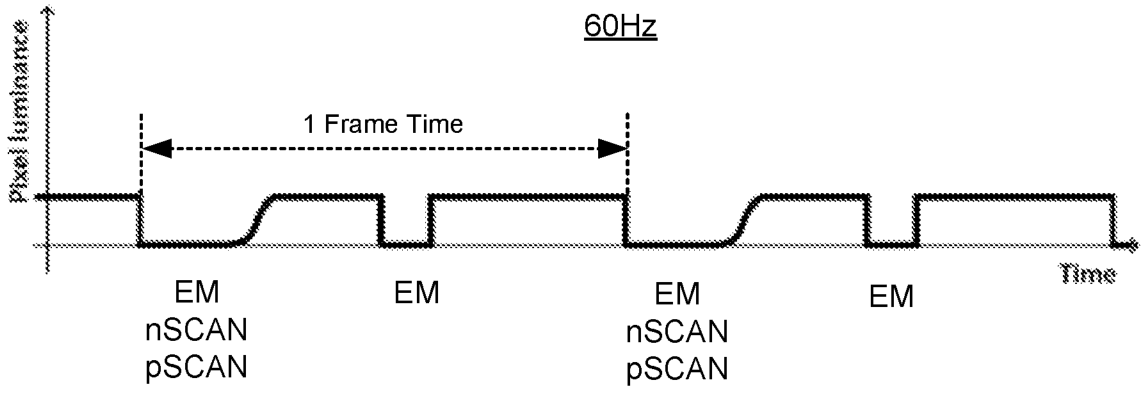
Figure 6C:
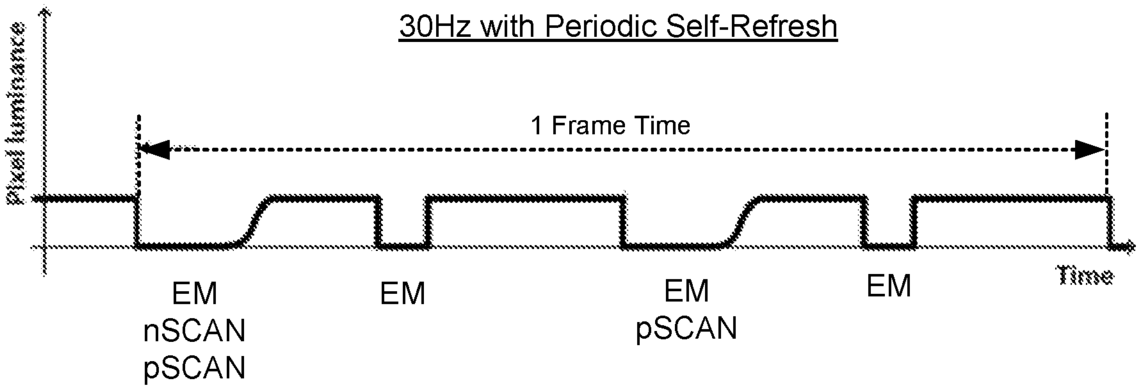

FIGS. 6A-C show consistent luminance profiles for three different refresh rates: 120 Hz with a periodically skipped anode discharge (FIG. 6A), 60 Hz (FIG. 6B), and 30 Hz with a self-refresh (FIG. 6C). This three-refresh rate emission scheme is the same as that illustrated with FIGS. 5A-C, except that the 120 Hz refresh profile alternates between a full refresh (indicated by labels EM, nSCAN, and pSCAN) and a full refresh in which anode discharge is skipped (indicated by labels EM, nSCAN, pSCAN, and Skipped).

Figure 7A:
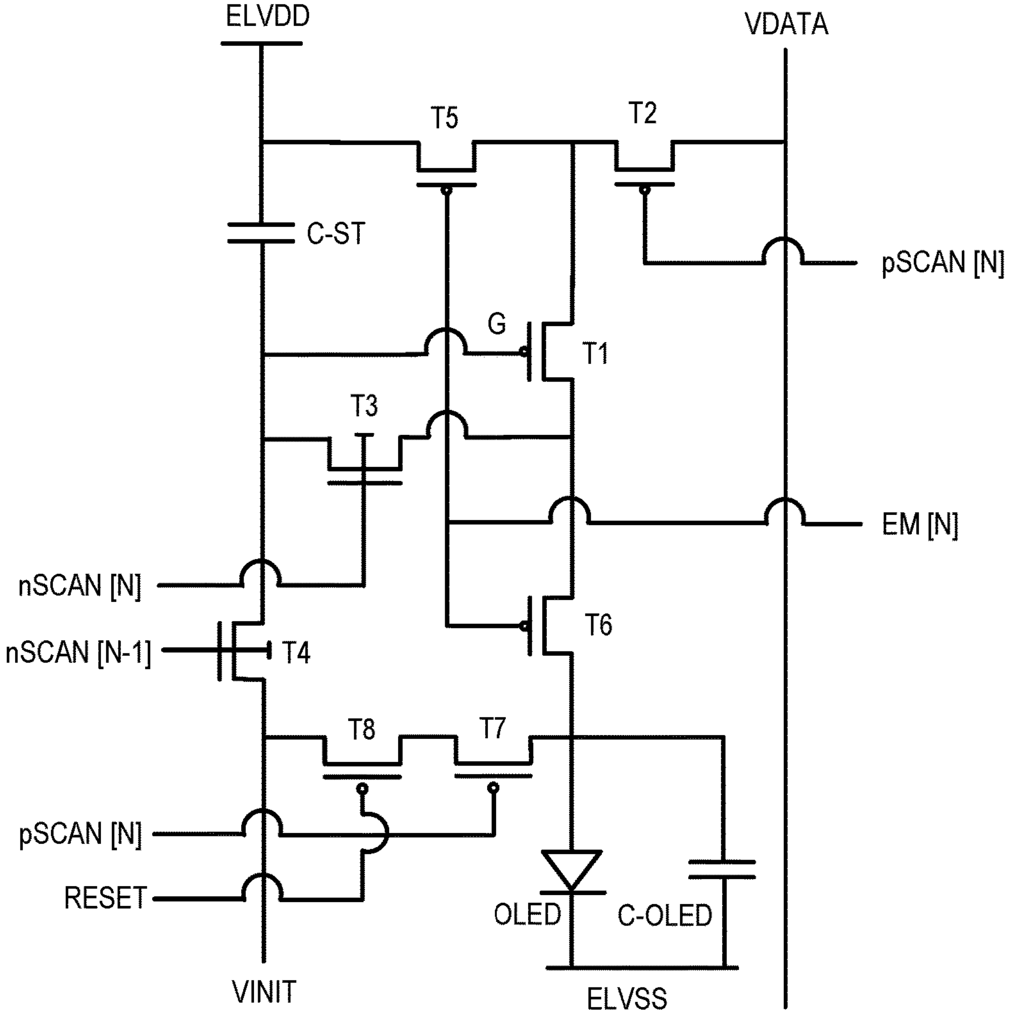
FIGS. 7A-B show a diagram of a pixel circuit and a corresponding timing diagram that implements an LED anode skip reset every other frame.

The ability to skip anode discharge can be implemented by circuitry that intermittently prevents the initialization of the OLED to the initialization voltage VINT at the same time that the G node is initialized to the initialization voltage VINT. An example way to prevent initialization of only the OLED (and not the G node) is to include a transistor T8 in the pixel circuit, as shown in FIG. 7A. Transistor T8 is located in series with the transistor T7 between the initialization voltage VINT signal line and the anode of the OLED. A RESET signal connected to the gate of this additional transistor T8 can be turned off in order to prevent the OLED from being initialized to the initialization voltage VINT, even if the pSCAN signal line has turned on transistor T7.

After this initialization of only the G node (not the OLED), the G node is programmed with a new data voltage, and pixel emission is turned on. The OLED voltage rises from the OLED threshold voltage to which the OLED voltage had settled and current is driven through the OLED at a level defined by the newly-programmed voltage at the G node. The intensity of the OLED climbs relatively quickly to the programmed level because the OLED voltage had only dropped to the OLED threshold voltage and had not been initialized all the way to the initialization voltage.

Accordingly, transitioning the RESET signal between "off" and "on" states at half the rate of the 120 Hz refresh rate results in half of the transitions in which the pixel turns on occurring at a relatively-rapid rate that corresponds to that which occurs when the emission signal is cycled "off" then "on" (e.g., as labelled by "EM" in FIGS. 6B and 6C).

Figure 7B:
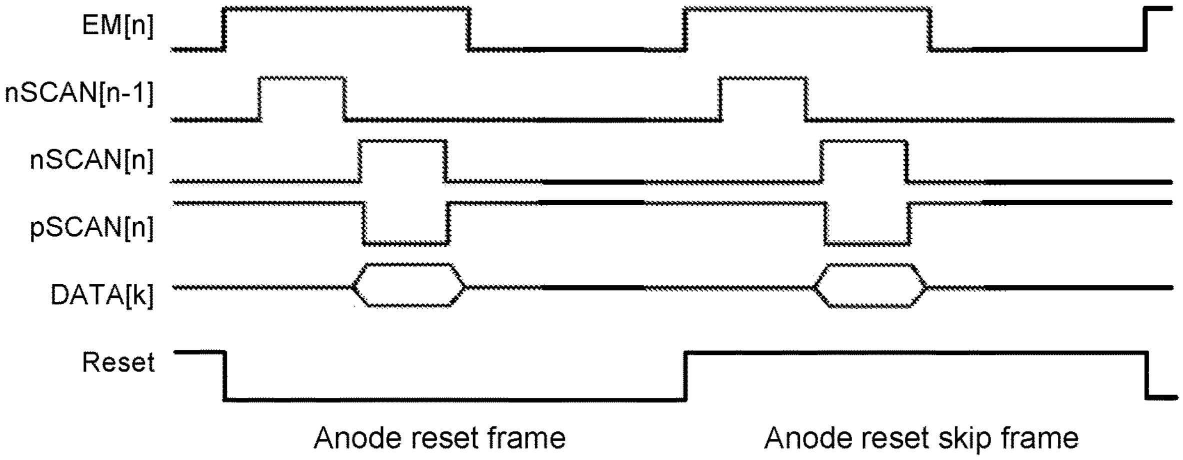

FIG. 7B shows a timing diagram of signals that implement a refresh pattern in which OLED anode discharge is skipped every other frame, to result in the luminance profile shown in FIG. 6A. The EM, nSCAN, pSCAN, and DATA signals operate as they traditionally do for a "full refresh" refresh pattern, but the RESET signal alternates once from "off" to "on" or vice versa every display frame time, such that the RESET signal has a frequency that is half that of the EM signal. As such, the added transistor T8 is left off once every two frames, blocking the initialization of the OLED once every two frame. This results in a luminance profile at 120 Hz (FIG. 6A) that corresponds to that of the 60 Hz (FIG. 6B) and 30 Hz (FIG. 6C) luminance profiles.

A display device that is configured to periodically discharge the anode of the OLED while at 120 Hz enables a three-refresh rate emission scheme in which an electronic device can present content on a display device at three different refresh rates that have the same luminance profile. As such, only a single optical tuning (e.g., gamma correction and calibration table) is needed for all three refresh rates. Also, the pixel illuminates at a consistent intensity when changing from one refresh rate to another (e.g., there is no step change in intensity).

The RESET line that toggles the transistor T8 between on and off states may be provided to each pixel in an array of pixels, and may be a common signal sent to all such pixels. The RESET signal operates at least when the pixel array is operating at the 120 Hz refresh rate, although it may also operate at the lower refresh rates without consequence to operation of the pixel array.

This disclosure focuses on the description of a single OLED and its corresponding circuitry, representing a single sub-pixel or pixel, but the technologies described herein can be replicated across an entire pixel array so that all pixels can operate with the same luminance profile. Also, this disclosure has discussed operation of a pixel that is being programmed with a steady intensity level. In actual operation of a display device, a pixel's intensity level would likely change from frame to frame with presentation of dynamic content (e.g., a movie). While the three-refresh rate emission scheme has been described with respect to the 120 Hz, 60 Hz, and 30 Hz refresh rates, it may apply to any set of refresh rates in which a high refresh rate is twice a middle refresh rate and four times a low refresh rate.

In an alternative embodiment, the transistor T8 is not included in the circuit and T7 is driven by a pSCAN2 line that turns on T7 half as often as T2 is turned on by pSCAN (e.g., pSCAN2 has half the frequency of pSCAN). pSCAN2 would turn on the transistor T7 at the same time that pSCAN turns on the transistor T2.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A pixel circuit, including:

an LED with an anode terminal and a cathode terminal;

a driving transistor including a drain terminal, the drain terminal of the driving transistor being connected to the anode terminal of the LED to supply power to the LED;

a second transistor that is connected between an initialization voltage line that specifies an initialization voltage and the anode terminal of the LED, the second transistor having a gate terminal that is connected to a scan line; and a third transistor that is connected between the initialization voltage line and the anode terminal of the LED in series with the second transistor, the third transistor having a gate terminal that is connected to a reset line, wherein the pixel circuit is configured so that activating the scan line at a first frequency and activating the reset line at a second frequency that is half the first frequency causes the pixel circuit to initialize the LED based on the initialization voltage every other time the scan line is activated.

2. The pixel circuit of claim 1, comprising:

a fourth transistor connected between the initialization voltage line and a gate terminal of the driving transistor, the fourth transistor having a gate terminal that is connected to a second scan line that is different from the scan line.

3. The pixel circuit of claim 1, wherein the pixel circuit is configured so that: activating the scan line at the first frequency includes periodically turning the second transistor on at the first frequency;

activating the reset line at the second frequency includes periodically turning the third transistor on at the second frequency; and the pixel circuit initializes the LED responsive to the pixel circuit turning the second transistor on and the third transistor on simultaneously.

4. The pixel circuit of claim 3, wherein the pixel circuit is configured so that:

activating the scan line at the first frequency includes periodically turning on the second transistor for a first period of time;

activating the reset line at the second frequency includes periodically turning on the third transistor for a second period of time;

the first period of time overlaps with the second period of time; and the second period of time is greater than the first period of time.

5. The pixel circuit of claim 1, wherein the pixel circuit is configured so that, at a first display device refresh frequency that has a first frame time, the pixel circuit alternates between a first frame type and a second frame type, the first frame type includes the scan line being activated concurrently with the reset line being activated, causing both the LED and the gate terminal of the driving transistor to be initialized based on the initialization voltage, and the second frame type includes the scan line being activated concurrently with the reset line being not activated, causing the LED to be left without being initialized and the gate terminal of the driving transistor to be initialized based on the initialization voltage.

6. The pixel circuit of claim 5, wherein during the second frame type a voltage across the LED drops to a threshold voltage of the LED based on power to the LED being interrupted.

7. The pixel circuit of claim 5, wherein the pixel circuit is configured so that, at a second display device refresh frequency that is half the first display device refresh frequency, the pixel circuit repeatedly presents a third frame type that includes a first frame portion and a second frame portion, the first frame portion includes the scan line being activated concurrently with the reset line being activated, causing both the LED to be initialized based on the initialization voltage and the gate terminal of the driving transistor to be initialized based on the initialization voltage; and the second frame portion includes the scan line being not activated concurrently with power to the LED being interrupted, causing the LED to turn off without being initialized and the gate terminal of the driving transistor being left without being initialized.

8. The pixel circuit of claim 7, wherein:

the first frame portion represents a first half of the third frame type; and the second frame portion represents a second half of the third frame type.

9. The pixel circuit of claim 7, wherein the second frame portion, during which the scan line is not activated concurrently with power to the LED being interrupted, causes a voltage across the LED to drop to a threshold voltage of the LED and the gate terminal of the driving transistor to maintain a previously-programmed voltage value.

10. The pixel circuit of claim 7, wherein:

the first display device refresh frequency corresponds to 120 Hz; and the second display device refresh frequency corresponds to 60 Hz.

* * * * *